United States Patent
Lee et al.

(10) Patent No.: US 9,483,516 B2
(45) Date of Patent: Nov. 1, 2016

(54) MULTI-VERSION CONCURRENCY CONTROL ACROSS ROW STORE AND COLUMN STORE

(71) Applicants: Juchang Lee, Seoul (KR); Ivan Schreter, Malsch (DE); Chang Gyoo Park, Seoul (KR); Jaeyun Noh, Seoul (KR); Eunsang Kim, Seoul (KR); Sang Kyun Cha, Seoul (KR)

(72) Inventors: Juchang Lee, Seoul (KR); Ivan Schreter, Malsch (DE); Chang Gyoo Park, Seoul (KR); Jaeyun Noh, Seoul (KR); Eunsang Kim, Seoul (KR); Sang Kyun Cha, Seoul (KR)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 14/213,807

(22) Filed: Mar. 14, 2014

(65) Prior Publication Data
US 2015/0261805 A1    Sep. 17, 2015

(51) Int. Cl.
*G06F 17/30* (2006.01)

(52) U.S. Cl.
CPC ... *G06F 17/30353* (2013.01); *G06F 17/30356* (2013.01); *G06F 17/30371* (2013.01)

(58) Field of Classification Search
CPC .................. G06F 17/30345; G06F 17/30348; G06F 17/30351; G06F 17/30353; G06F 17/30356; G06F 17/30371
USPC ........................................ 707/695, 703, 704
See application file for complete search history.

(56) References Cited

U.S. PATENT DOCUMENTS

| | | | |
|---|---|---|---|
| 8,321,867 B1* | 11/2012 | Holl, II | G06F 3/0605 714/48 |
| 2006/0101025 A1* | 5/2006 | Tichy | G06F 17/30067 707/999.1 |
| 2009/0070330 A1 | 3/2009 | Hwang et al. | |
| 2012/0047126 A1* | 2/2012 | Branscome | G06F 17/30519 707/714 |
| 2012/0084274 A1 | 4/2012 | Renkes et al. | |
| 2012/0221528 A1* | 8/2012 | Renkes | G06F 17/30315 707/674 |
| 2013/0060742 A1* | 3/2013 | Chang | G06F 17/30359 707/704 |

OTHER PUBLICATIONS

Wikipedia, "Multiversion concurrency control," <http://en.wikipedia.org/wiki/Multiversion_concurrency_control>, 6 pages (accessed Feb. 3, 2014).
Lee et al., "High-Performance Transaction Processing in SAP HANA," IEEE Data Eng. Bull. 36(2): pp. 28-33 (Jun. 2013).

* cited by examiner

*Primary Examiner* — Hares Jami
(74) *Attorney, Agent, or Firm* — Klarquist Sparkman, LLP (57) ABSTRACT

Techniques and solutions are provided for performing transactions within a database system that stores database data using a row store and a column store. For example, a transaction that performs operations to update data in both the row store and the column store can use the same transaction object. The state of the transaction can be atomically changed. For example, the state of the transaction object can be atomically changed from uncommitted to committed (e.g., set to a commit identifier to represent the committed state).

19 Claims, 5 Drawing Sheets

MULTI-VERSION CONCURRENCY CONTROL ACROSS ROW STORE AND COLUMN STORE

BACKGROUND

In a database management system, multi-version concurrency control (MVCC) can be used to provide concurrent access to the database by multiple users or applications. With MVCC, a database user that is reading data from the database can be provided a consistent view of the data (e.g., a snapshot) even while another user is writing to the database at the same time (e.g., during the first user's read transaction).

However, existing MVCC systems have limited functionality. For example, MVCC systems may not be capable of providing concurrency control for data stored across different data stores or across different types of table storage.

Therefore, there exists ample opportunity for improvement in technologies related to concurrency control in database systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for implementing multi-version concurrency control within database systems. For example, concurrency control can be provided between a row store and a column store where a transaction that performs operations to update data in both the row store and the column store use the same commit record (e.g., the same transaction object). The state of the commit record can be atomically changed. For example, the state of the commit record can be atomically changed from uncommitted to committed (e.g., set to a commit identifier to represent the committed state).

In some implementations, records reflecting a row store update and records reflecting a column store update are associated with transaction objects (e.g., via pointers). A transaction that is performing an update is associated with a transaction object (e.g., stored by the transaction manager) regardless of whether the transaction is updating the row store, the column store, or both. For example, a transaction that is performing updates to both the row store and column store are associated with the same transaction object.

As described herein, a variety of other features and advantages can be incorporated into the technologies as desired.

DETAILED DESCRIPTION

Example 1

Overview

The following description is directed to techniques and solutions for implementing multi-version concurrency control within database systems. For example, transactions can be performed across a row store and a column store using the same transaction objects across the row store and the column store.

In some database systems, concurrency control is provided separately within the row store and the column store. For example, a transaction may update data within the row store, which can include creating a separate version of the updated data linked to an independent record reflecting the state of the row store update operation (e.g., uncommitted or committed). The same transaction may also update data within the column store, which can include creating an updated version of the data linked to an independent record (separate from the row store record) reflecting the state of the column store update operation (e.g., committed or uncommitted). However, providing separate records (or other types of data structures) within the row store and the column store to keep track of the state of the transaction (e.g., when it is uncommitted and when it is committed) may not be capable of providing a consistent view across the row store and the column store. For example, a transaction that is updating both the row store and the column store may commit the row store update and the column store update at different times, which can allow a transaction reading the same row store and/or column store data to see an inconsistent state of the database (e.g., some data that has been updated and other data that has not yet been updated by the transaction). In addition, keeping track of separate records can require additional locking and/or coordination (e.g., between both the row store and the column store) when both records need to change state (e.g., from uncommitted to committed).

The technologies described herein can be applied to an in-memory database system that stores database data in both a row store and a column store. In a row store, database data is organized by row. In a column store, database data is organized by column. For example, certain database tables can be designated for storage in a row store structure while other database tables can be designated for storage in a column store structure. Transactions that are performed using the row store and/or the column store can use transaction objects that are shared across the row store and the column store. For example, a transaction that updates data in the row store and the column store can be associated with the same transaction object that is used when atomically committing the transaction.

The technologies described herein can be applied to an in-memory database management system, such as the HANA database (HANA is a database platform provided by SAP®)/. The in-memory database management system can store the row store and the column store in memory. In some implementations, all data is resident in memory. In other implementations, only a portion of the data is resident in memory (e.g., frequently used and/or important data).

Example 2

In-Memory Database Environments

In any of the examples herein, an in-memory database environment (e.g., an in-memory database system) can be provided for executing transactions using data stored in a row store and a column store. The transactions can be implemented using transaction objects that are shared across the row store and the column store.

Figure 1:
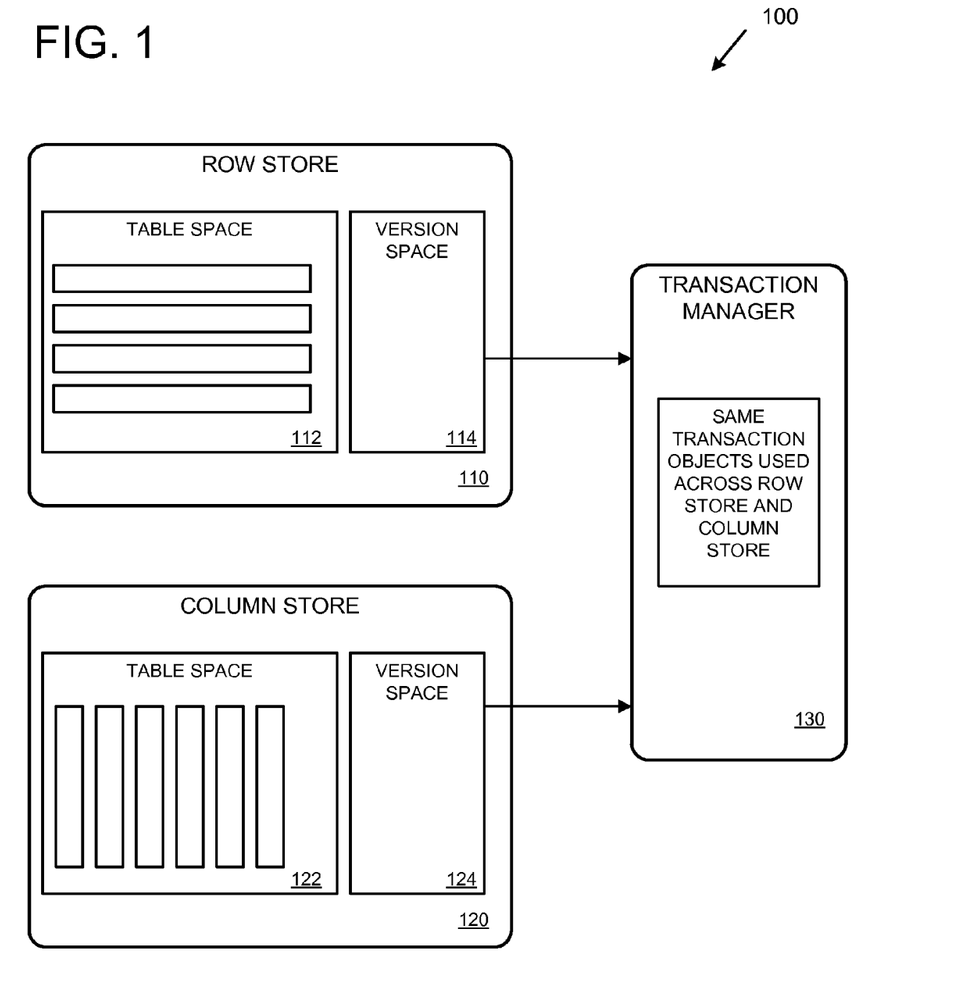
FIG. 1 is a diagram depicting an example in-memory database environment for performing transactions across a row store and a column store.

FIG. 1 is a diagram depicting an example in-memory database environment 100 for performing transactions across a row store and a column store. The in-memory database environment 100 can implemented by various types of computing devices, such as computer servers, data storage systems, cloud computing resources, networking resources, etc.

The in-memory database environment 100 stores database data (e.g., data in database tables) using, at least in part, a row store 110 and a column store 120. The row store 110 stores database data organized by rows, as depicted by the row store table space 112. The column store 120 stores database data organized by columns, as depicted by the column store table space 122. For example, a database administrator or another type of user can designate which database data is to be stored in the row store 110 and which database data is to be stored in the column store 120.

The row store 110 comprises version space 114. The version space 114 can store information about row store data being updated by transactions. For example, the version space 114 can store information associating updated row store data with transaction objects.

The column store 120 also comprises version space 124. The version space 124 can store information about column store data being updated by transactions. For example, the version space 124 can store information associating updated column store data with transaction objects.

The in-memory database environment 100 comprises a transaction manager 130. The transaction manager 130 participates in performing transactions within the database environment 100 and stores transaction objects used by the transactions. The transaction objects are shared across the row store 110 and the column store 120 (e.g., a transaction object can represent a transaction that is performing just an update to the column store 120, just an update to the row store 110, or updates to both the row store 110 and the column store 120). For example, if a particular transaction is updating row store data and column store data, then a single transaction object can be used by the transaction (e.g., to store the state of the transaction and to store a commit identifier when the transaction is committed).

Transactions within the in-memory database environment 100 are performed, at least in part, by the transaction manager 130. For example, the transaction manager 130 can create a transaction object when a transaction first performs an update of data (e.g., by writing or modifying row store data in the row store 110 and/or column store data in the column store 120). The transaction manager 130 can initially set the transaction object to an uncommitted state. When the transaction updates data in the row store 110, an association can be created between the updated row store data and the transaction object associated with the transaction. For example, a pointer from the version space 114 can be created that points to the transaction object in the transaction manager 130 that is associated with the transaction. When the transaction updates data in the column store 120, an association can be created between the updated column store data and the transaction object associated with the transaction. For example, a pointer from the version space 124 can be created that points to the transaction object in the transaction manager 130 that is associated with the transaction. In this way, the same transaction object can be associated with a transaction that is updating database data both in the row store 110 and the column store 120.

The transaction manager 130 can atomically commit transactions using transaction objects. For example, the transaction manager 130 can commit a transaction by switching the state of the transaction object associated with the transaction from uncommitted to committed (e.g., by assigning a unique commit identifier value to the transaction object upon commit).

Figure 2:
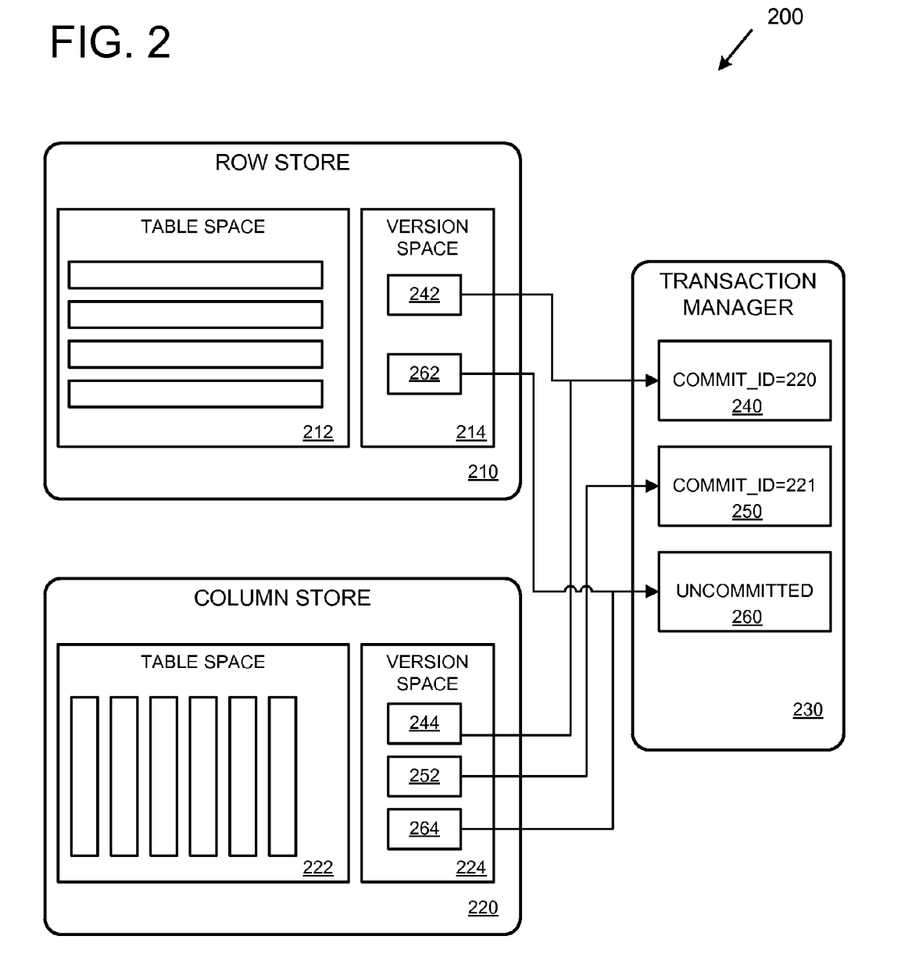
FIG. 2 is a diagram depicting an example in-memory database environment for performing transactions across a row store and a column store using transaction objects.

FIG. 2 is a diagram depicting an example in-memory database environment 200 for performing transactions across a row store and a column store using transaction objects. The in-memory database environment 200 can implemented by various types of computing devices, such as computer servers, data storage systems, cloud computing resources, networking resources, etc.

The in-memory database environment 200 stores database data (e.g., data in database tables) using, at least in part, a row store 210 and a column store 220. The row store 210 stores database data organized by rows, as depicted by the row store table space 212. The column store 220 stores database data organized by columns, as depicted by the column store table space 222. For example, a database administrator or another type of user can designate which database data is to be stored in the row store 210 and which database data is to be stored in the column store 220.

The row store 210 comprises version space 214. The version space 214 can store information about row store data being updated by transactions. For example, the version space 214 can store information associating updated row store data with transaction objects. In some implementations, updated row store data record versions of the row store data are stored in the version space 214. In other implementations, updated row store data record versions of the row store data are stored in the table space 212 (e.g., appended to the existing rows in the table space 212).

The column store 210 also comprises version space 224. The version space 224 can store information about column store data being updated by transactions. For example, the version space 224 can store information associating updated column store data with transaction objects. In some implementations, updated column store data record versions of the column store data are stored in the version space 224. In other implementations, updated column store data record versions of the column store data are stored in the table space 222 (e.g., appended to the existing columns in the table space 222).

The in-memory database environment 200 comprises a transaction manager 230. The transaction manager 230 participates in performing transactions within the database environment 200 and stores transaction objects used by the transactions. The transaction objects are shared across the row store 210 and the column store 220 (e.g., a transaction object can represent a transaction that is performing just an update to the column store 220, just an update to the row store 210, or updates to both the row store 210 and the column store 220). For example, if a particular transaction is updating row store data and column store data, then a single transaction object can be used by the transaction (e.g., to store the state of the transaction and to store a commit identifier when the transaction is committed).

The in-memory database environment 200 depicts example transaction objects for a number of transactions. A first transaction, represented by transaction object 240, is depicted. The first transaction is updating data in the row store 210 and data in the column store 220. Specifically, the first transaction is updating row store data that is reflected by the updated row store information 242 (e.g., one or more records that indicate, or contain, an updated version of data from the row store, such as an entire row of data or an individual data element) in version space 214 of the row store 210. The updated row store information 242 is associated with the transaction object 240 in the transaction manager 230 (e.g., by a pointer from the updated row store information 242 to the transaction object 240). The first transaction is also updating column store data that is reflected by the updated column information 244 (e.g., one or more records that indicate, or contain, an updated version of data from the column store, such as an updated column of data or an individual data element) in version space 224 of the column store 220. The updated column store information 244 is associated with the transaction object 240 in the transaction manager 230 (e.g., by a pointer from the updated column store information 244 to the transaction object 240). In this example, the first transaction has been committed, as indicated by the commit identifier value of "220" assigned to the transaction object 240.

A second transaction, represented by transaction object 250, is also depicted. The second transaction is only updating data in the column store 220. The updated column store information 252 is associated with the transaction object 250 in the transaction manager 230. In this example, the second transaction has been committed, as indicated by the commit identifier value assigned to the transaction object 250.

A third transaction, represented by transaction object 260, is also depicted. The third transaction is updating data in the row store 210 and data in the column store 220. Specifically, the third transaction is updating row store data that is reflected by the updated row store information 262 in version space 214 of the row store 210 that is associated with the transaction object 260. The third transaction is updating column store data that is reflected by the updated column store information 264 in version space 224 of the column store 220 that is also associated with the transaction object 260. In this example, the third transaction has not yet been committed, as indicated by the "uncommitted" state assigned to the transaction object 260.

As depicted by the three example transactions, the same transaction objects are shared across the row store 210 and the column store 220. For example, the transaction object 240 for the first transaction is associated (e.g., via pointers) with the updated row store information 242 and the updated column store information 244. In order to commit the entire transaction (e.g., a transaction with multiple updates to the row store and/or column store), an atomic commit can be performed (e.g., by the transaction manager 230) to change the state of the transaction object from uncommitted to committed. For example, the atomic commit can be performed by assigning a global commit identifier value to the transaction object 240.

Figure 3:
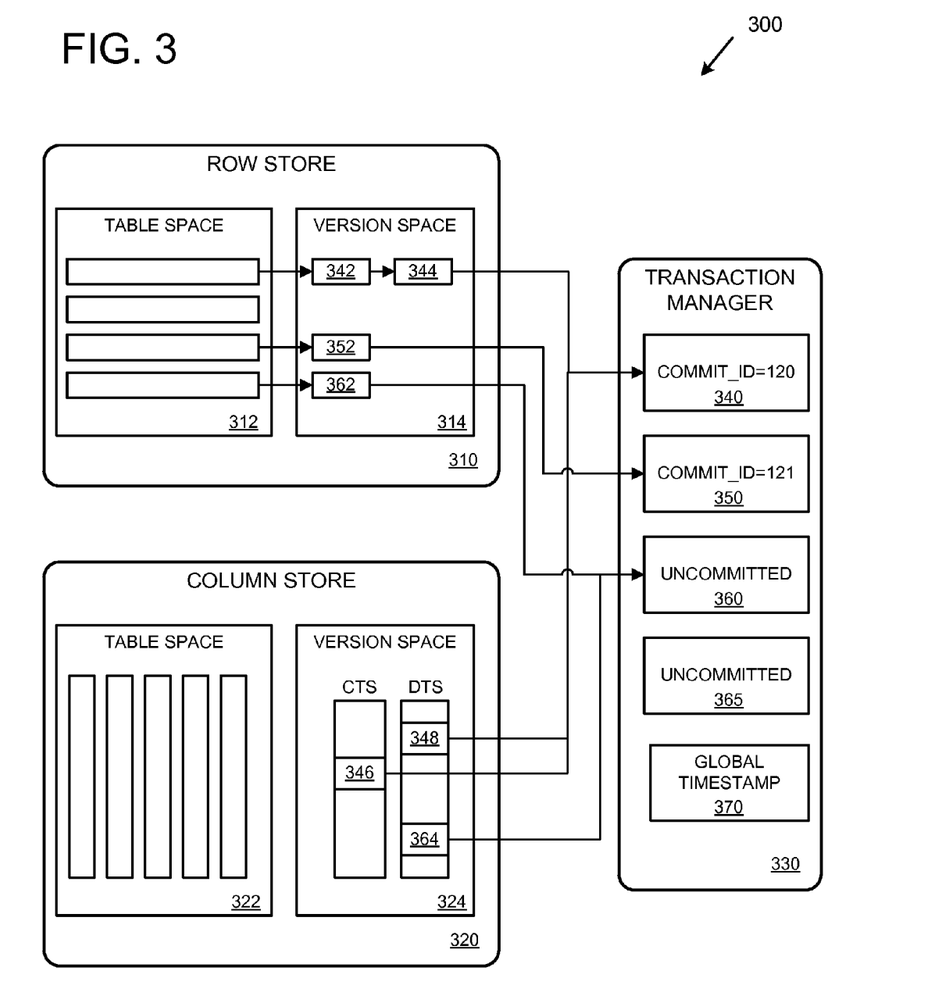
FIG. 3 is a diagram depicting an example in-memory database environment for performing transactions across a row store and a column store using transaction objects and a global timestamp.

FIG. 3 is a diagram depicting an example in-memory database environment 300 for performing transactions across a row store and a column store using transaction objects and a global timestamp. The in-memory database environment 300 can implemented by various types of computing devices, such as computer servers, data storage systems, cloud computing resources, networking resources, etc.

The in-memory database environment 300 stores database data (e.g., data in database tables) using, at least in part, a row store 310 and a column store 320. The row store 310 stores database data organized by rows, as depicted by the row store table space 312. The column store 320 stores database data organized by columns, as depicted by the column store table space 322.

The row store 310 comprises version space 314. The version space 314 can store information about row store data being updated by transactions. In the implementation depicted in the in-memory database environment 300, the version space 314 stores versions of the data in the table space 312. For example, if a transaction is updating data in a row in the table space 312, then a new version of the data can be inserted into the version space 314 (e.g., a data record with an updated row of data and/or one or more updated data items). The original data (e.g., the original row of data and/or one or more original data items) in the table space 312 can be called the original row store record version and the updated data in the version space 314 can be called the new row store data record version (or the updated row store data record version). Multiple versions of the data record can be created in the version space 314. For example, a first transaction can update a particular row to create a new record version (e.g., new record version 342), and a second transaction can update the particular row to create another new record version (e.g., new record version 344).

The column store 320 also comprises version space 324. The version space 324 can store information about column store data being updated by transactions. In the implementation depicted in the in-memory database environment 300, the version space 324 stores information in a different way than the version space 314 of the row store 310. Specifically, the version space 324 stores creation timestamp (CTS) values and destroy timestamp (DTS) values, while updated column store data (e.g., a column or one or more data items in a column) is stored in the table space 322. For example, when a transaction is updating data in a column within the table space 322, a new column store data record version can be appended to the column being updated in the table space 322. A corresponding CTS value can be generated for the new column store data record version and a DTS value can be generated for the original column store data record version. As with the row store 310, multiple versions of updated data records can be added to the table space 322 of the column store 320.

The in-memory database environment 300 depicts example transaction objects for a number of transactions. A first transaction, represented by transaction object 340, is depicted. The first transaction is updating data in the row store 310 and data in the column store 320. Specifically, the first transaction is updating row store data that is reflected by the new row store data record version 344 in version space 314 of the row store 310. The new row store data record version 344 is associated with the transaction object 340 in the transaction manager 330 (e.g., by a pointer from the new row store data record version 344 to the transaction object 340). The first transaction is also updating column store data that is reflected by the destroy timestamp record 348 and creation timestamp record 346, which are both associated with the transaction object 340 (e.g., via pointers from the destroy timestamp record 348 and creation timestamp record 346 to the transaction object 340). In this example, the first transaction has been committed, as indicated by the commit identifier value assigned to the transaction object 340.

A second transaction, represented by transaction object 350, is also depicted. The second transaction is only updating data in the row store 310. The new row store data record version 352 is associated with the transaction object 350 in the transaction manager 330 (e.g., via a pointer from the new row store data record version 352 to the transaction object 350). In this example, the second transaction has been committed, as indicated by the commit identifier value assigned to the transaction object 350.

A third transaction, represented by transaction object 360, is also depicted. The third transaction is updating data in the row store 310 and data in the column store 320. Specifically, the third transaction is updating row store data that is reflected by the new row store data record version 362 in version space 314 of the row store 310. The new row store data record version 362 is associated with the transaction object 360 in the transaction manager 330 (e.g., by a pointer from the new row store data record version 362 to the transaction object 360). The third transaction is also updating column store data that is reflected by the destroy timestamp record 364, which is associated with the transaction object 360 (e.g., via a pointer from the destroy timestamp record 364). The third transaction is in the process of performing the update to the column store data, and has not yet created the creation timestamp record. In this example, the third transaction has not yet been committed, as indicated by the "uncommitted" state assigned to the transaction object 360.

A fourth transaction, represented by transaction object 365, is also depicted. The fourth transaction has not yet performed any updates.

The transaction manager 330 can atomically commit transactions. For example, the first transaction (represented by transaction object 340) can be atomically committed by the transaction manager 330 by switching the transaction object 340 from an uncommitted state to a committed state. In some implementations, the transaction manager, as part of the atomic commit, increments the global timestamp 370 to produce an incremented global timestamp value and assigns the incremented global timestamp value to the transaction object 340 (as depicted by the global timestamp value of "120" assigned to transaction object 340).

For example, the global timestamp 370 can represent a component that provides a unique global time stamp value that can be assigned to transaction objects. In some implementations, the global timestamp 370 increments a counter and provides the next global timestamp value (e.g., if the current counter value is "500", then the global timestamp 370 would generate the next global timestamp value of "501" upon transaction commit and provide it for assignment to the transaction object).

In some implementations, multiple transactions are grouped together and atomically committed. For example, multiple transaction objects can be associated with a single group commit object. With reference to FIG. 3, transactions 360 and 365 could be grouped together using a single group commit object (not depicted) stored by the transaction manager 330 (e.g., via pointers from the transactions 360 and 365 to the group commit object). In order to commit transactions 360 and 365, an atomic commit can be performed that includes incrementing the global timestamp 370 and assigning the value (e.g., a commit identifier value, or Commit_ID value, of "122") to the group commit object.

In some implementations, the commit identifier is assigned to the row store and/or column store data records. For example, with reference to FIG. 3, the commit identifier value for transaction object 340 (Commit_ID value of "120") can be copied to the row store data records associated with the transaction object (row store data record version 344) and/or to the column store records associated with the transaction object (destroy timestamp record 348 and creation timestamp record 346). In this way, a transaction that is determining which data records are visible can use the commit identifier values obtained directly from the row store version space 314 and the column store version space 324 instead of having to follow the associations (e.g., pointers) to the transaction object (e.g., saving time that would otherwise be needed to perform the indirection).

Example 3

Methods for Performing Transactions within in-Memory Database Systems

In any of the examples herein, methods can be provided for performing transactions within an in-memory database system that stores database data using, at least in part, a row store and a column store. For example, transactions can be performing (e.g., by a transaction manager) using transaction objects that are shared across the row store and the column store. For example, a transaction can be performed using a single transaction object that is referenced by updates in the row store and/or the column store and atomically committed.

Figure 4:
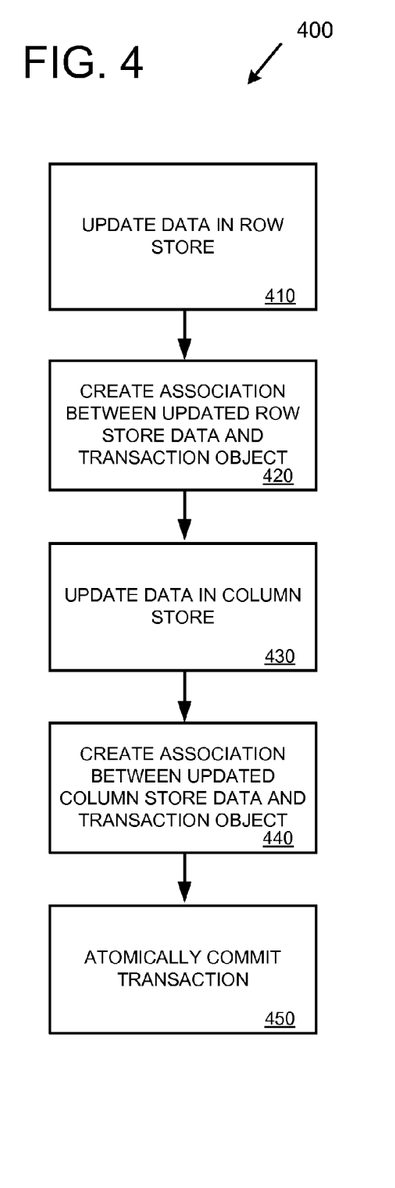
FIG. 4 is a flowchart of an example method for performing transactions within an in-memory database system.

FIG. 4 is a flowchart of an example method 400 for performing transactions within an in-memory database system that stores database data using, at least in part, a row store and a column store. For example, the example method 400 can be performed, at least in part, within the in-memory database environment 100, 200, or 300.

At 410, data in a row store is updated. For example, updating the data in the row store can comprise writing one or more rows of data and/or writing one or more data items. The updated data in the row store can be written to version space and/or table space of the row store (e.g., as a new row store data record version). In some implementations, the updated row store data is written to version space as a new row store data record version that is associated with the original row that is being updated (e.g., associated by a flag that indicates the existing row has been updated in the version space).

At 420, an association is created between the updated row store data and a transaction object associated with the transaction (e.g., a transaction object stored by a transaction manager). In some implementations, the association comprises a pointer associating the updated row store data with the transaction object (e.g., a pointer from a new row store data record version and the transaction record).

In some implementations, creating the association between the updated row store data and the transaction object (e.g., at 420) comprises creating a new row store data record version in version space associated with the row store and creating a pointer from the new row store data record version and the transaction object.

At 430, data in a column store is updated. For example, updating the data in the column store can comprise writing one or more columns of data and/or writing one or more data items. The updated data in the column store can be written to version space and/or table space of the column store (e.g., as a new column store data record version). In some implementations, the updated column store data is written to table space and appended to the existing column which is being updated (e.g., associated by a flag that indicates the existing column has been updated in the table space)

At 440, an association is created between the updated column store data and the transaction object associated with the transaction (the same transaction object that is referenced by the row store update at 420). In some implementations, the association comprises a pointer associating the updated column store data with the transaction object (e.g., a pointer from a creation timestamp and a destroy timestamp to the transaction record).

In some implementations, creating the association between the updated column store data and the transaction object (e.g., at 440) comprises creating a new column store data record version in table space associated with the column store, creating a destroy timestamp, in version space associated with the column store, associated with an original version of the column store data record, and creating a creation timestamp, in version space associated with the column store, associated with the new column store data record version. In some implementations, the destroy timestamp and the creation timestamp comprise pointers to the transaction object.

Figure 5:
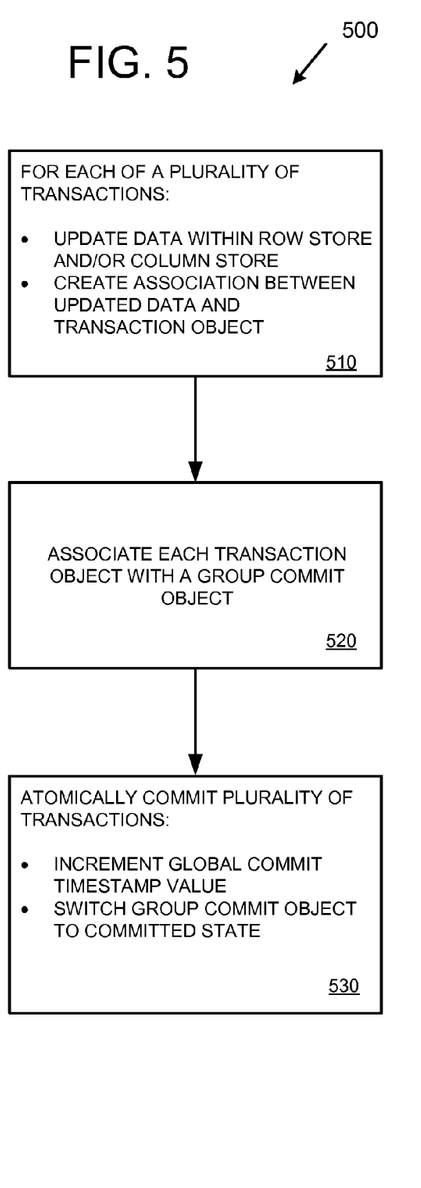
FIG. 5 is a flowchart of an example method for performing a plurality of transactions within an in-memory database system.

FIG. 5 is a flowchart of an example method 500 for performing a plurality of transactions within an in-memory database system that stores database data using, at least in part, a row store and a column store. For example, the example method 500 can be performed, at least in part, within the in-memory database environment 100, 200, or 300.

At 510, a number of operations are performed for each of a plurality of transactions. The operations include updating data within a row store and/or a column store. The operations also include creating associations between the updated data and a transaction object representing the transaction being performed. For example, the associations can comprise one or more pointers associating the updated row store data and/or column store data and the transaction object. In some implementations, for any row store data being updated, a pointer is created that points from the updated row store data to the transaction object. In some implementations, for any column store data being updated, pointers are created from creation timestamp and destroy timestamp records to the transaction object.

At 520, each transaction object is associated with a group commit object. In some implementations, a pointer is created linking each transaction object with the group commit object. The transaction objects and the group commit object can be stored and managed by a transaction manager.

At 530, the plurality of transactions is atomically committed. Atomically committing the plurality of transactions comprises incrementing a global timestamp value and switching the group commit object to a committed state by assigning the global timestamp value to the group commit object.

Using a group commit object to atomically commit a plurality of transactions can provide advantages. For example, a single assignment of the global commit timestamp value can be performed (to the group commit object) instead of assigning the global commit timestamp value to teach transaction object. In addition, a single disk operation can be performed as part of the atomic commit to write transaction log information for the plurality of transactions to disk.

Example 4

Row Store and Column Store Implementation

In this section, an example implementation is described providing multi-version concurrency control across a row store and a column store using transaction objects that are shared across the row store and column store. The techniques described in this section can be applied separately or in combination with techniques described elsewhere herein.

In the row store, if a row store data record (e.g., a row of data stored in the row store) is updated, a new version of the record is created in the version space (the multi-version concurrency control version space) and added to a version chain. In some implementations, each record (e.g., each row) is associated with its own unique row identifier (RowID). When the version chain is created for a given record, its RowState flag (e.g., which can be embedded in the record) is marked to indicate that the record has a version chain (e.g., for use by subsequent read and/or write operations). The version structure (e.g., row store data record) created in the version space has a pointer to the transaction object which created that version. Until the transaction is committed, the commit identifier (CommitID) information for the transaction is marked as 'uncommitted" and thus no other transaction can see the version. Once the transaction is committed, its assigned CommitID is written in the transaction object and the CommitID information can be retrieved by indirection from the version structure to the transaction object (e.g., when a reader transaction has to validate whether a given version is visible or not). A simplified depiction of the row store is presented in FIG. 3, where a new row store data record version 344 is associated (e.g., via a pointer) with transaction object 340, which stores the CommitID information.

In the column store, if a column store data record (e.g., a column of data stored in the column store) is updated, a new record version is appended to the column store table space along with an entry of a DTS (destroy timestamp) value of the existing record version (e.g., the existing column within the table space) and the CTS (creation timestamp) value of the newly appended record version (e.g., the newly appended column within the table space). The CTS and DTS values are stored in version space of the column store. Similar to the RowState flags of the row store, RowState flags are also maintained for the column store, but they are stored in version space in a separate contiguous array. The CTS and DTS entries have pointers to corresponding transaction objects. Therefore, once a transaction has been committed, and its CommitID assigned to its transaction object, the CommitID can be obtained by indirection from the CTS and DTS entries associated with the transaction. A simplified depiction of the column store is presented in FIG. 3, where DTS entry 346 and CTS entry 348 are associated (e.g., via pointers) with transaction object 340, which stores the CommitID information.

As described in this section, the row store and the column store share the same transaction objects and the CommitID values assigned to them. Therefore, if a transaction updates one record from a row store table and another record from a column store table within the same transaction boundary, the row store record version and the column store record version will point to the same transaction object and thus share the same CommitID value (once the transaction has been committed). Because the CommitID value is assigned to the transaction object upon transaction commit, and the row store and column store record versions are associated with the transaction object via pointers, the CommitID value can be applied to the row store version space and the column store version space consistently.

Transactions that are reading database data from the row store and/or column store can determine which record version to read (e.g., which record version, or versions, are visible to the transaction). In order to determine the record version that is readable (e.g., the latest record version that is readable), a SnapshotToken is maintained for each reader transaction. Upon transaction start time (in transaction-level snapshot isolation), or upon statement/query start time (in statement-level snapshot isolation), the global CommitID value of the transaction manager is copied to the transaction's SnapshotToken. When scanning the candidate versions, the reader transaction compares the CommitID stored in the SnapshotToken with the CommitID found by indirection to the transaction objects. If the CommitID of the reader transaction (obtained from its SnapshotToken) is less than or equal to the CommitID of a particular transaction object, then the record versions associated with the particular transaction object can be read by the transaction. Otherwise, the record versions are not visible to the transaction. In this way, the database system enforces multi-version concurrency control by presenting a reader transaction with a consistent view (snapshot) of the database data based on the transaction start time (for transaction-level snapshot isolation) or statement/query start time (for statement-level snapshot isolation).

Garbage collection can be performed to remove record versions that are no longer needed. For example, a record version in version space and/or table space can be removed or compacted if there are no potential readers (e.g., based on the SnapshotTokens of the current transactions) that can read the record version.

The following algorithms illustrate various operations involved with performing transactions using a row store and a column store. The following algorithms describe operations using the example implementation of this section. Other implementations described herein can use different algorithms.

Example algorithm, updating a row store record:
1. Update the RowState flag of the record.
2. Create a new record version in the version space, which comprises the pointer to the current transaction object and the new record image.
3. Find an existing version chain for the RowID of the updated record.
4. If there is no version chain, create a new one by using the record version created at step #2.
5. If there is an existing version chain, add the record version created at step #2 to the version chain.

Example algorithm, updating a column store record:
1. Create a new record version and append to the table space.
2. For the new record version, update its RowState flag and store the pointer to the current transaction object in its CTS field.
3. For the previous record version, store the pointer to the new record version in its DTS field and update its RowState flag, if necessary.

Example algorithm, committing an update transaction:
1. Write the commit log record.
2. Increment the global CommitID in the transaction manager and copy the new global CommitID value into the CommitID field of the transaction object.

Example algorithm, reading a row store record:
1. Copy the global CommitID in the transaction manager to the reader's local SnapshotToken.
2. Identify a target row store record to read.
3. If the RowState flag of the target record is not set, read the record in the table space directly (there are no updated versions of the record in version space so the original row store data record can be read from table space).
4. If the RowState flag of the target record is set, find the version chain of the record by using the RowID of the record and do the following for each record version scanning the version chain from the latest version first (from the end of the chain back):
   A. Get the CommitID of the record version by indirection to its transaction object.
   B. If the CommitID of the record version is less than or equal to the CommitID of the reader's SnapshotToken (assigned at the step #1), read the record version and return.

Example algorithm, reading a column store record:
1. Copy the global CommitID in the transaction manager to the reader's local SnapshotToken.
2. Identify a target column store record to read.
3. If the RowState flag of the target record is not set, read the record in the table space directly (there are no updated versions of the record in table space so the original column store data record can be read from table space).
4. If the RowState flag of the target record is set:
   A. If the commitID pointed by the CTS of the record version is less than or equal to the CommitID of the reader's SnapshotToken (assigned at the step #1), read the record version and return.
   B. If not, find the next version by looking up its DTS value and repeat from the step #3.

Example 5

Optimizations

This section describes example optimizations that can be applied to the technologies described herein.

An example optimization can be used to group multiple transaction objects together using a group commit object. By linking multiple transaction objects to a single group commit object, the single group commit object can store the state multiple transaction objects (e.g., uncommitted or committed) and the multiple transaction objects can be committed using a single atomic commit. For example, when a group commit happens for 10 concurrent transactions, only a single data structure can be updated (e.g., the group commit object) instead of the 10 separate transaction objects individually.

Another example optimization can be applied to copy CommitID values from the transaction objects to version space of the row store and column store. This optimization can be applied to reduce the cost of performing indirections from the version records (e.g., the row store records stored in version space of the row store and the DTS and CTS records stored in version space of the column store) to the transaction objects. With this optimization, the CommitID values are copied from the transaction object to the version space records. Then, when a transaction needs to determine if it can read a version of a row store record and/or column store record, the transaction does not need to perform indirection to follow the pointer from the version space record to the transaction object to check the CommitID. Instead, the transaction can just obtain the CommitID from the version space records directly. In some implementations, the pointers from the version space records are replaced by the CommitID value (e.g., because the pointers are no longer necessary as the CommitID value is stored locally).

Example 6

Computing Systems

Figure 6:
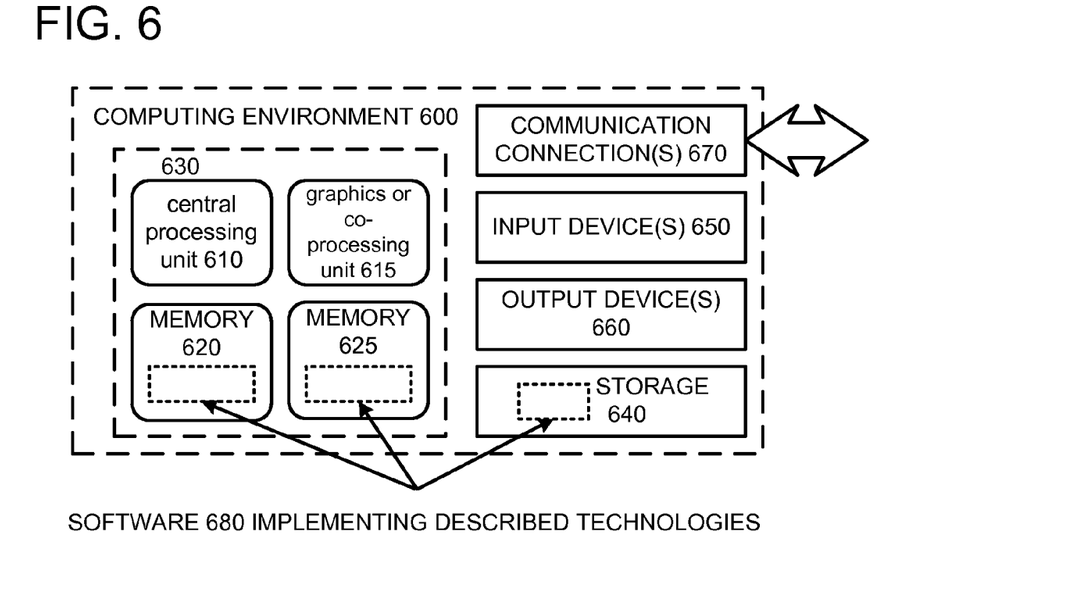
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7

Cloud Computing Environment

Figure 7:
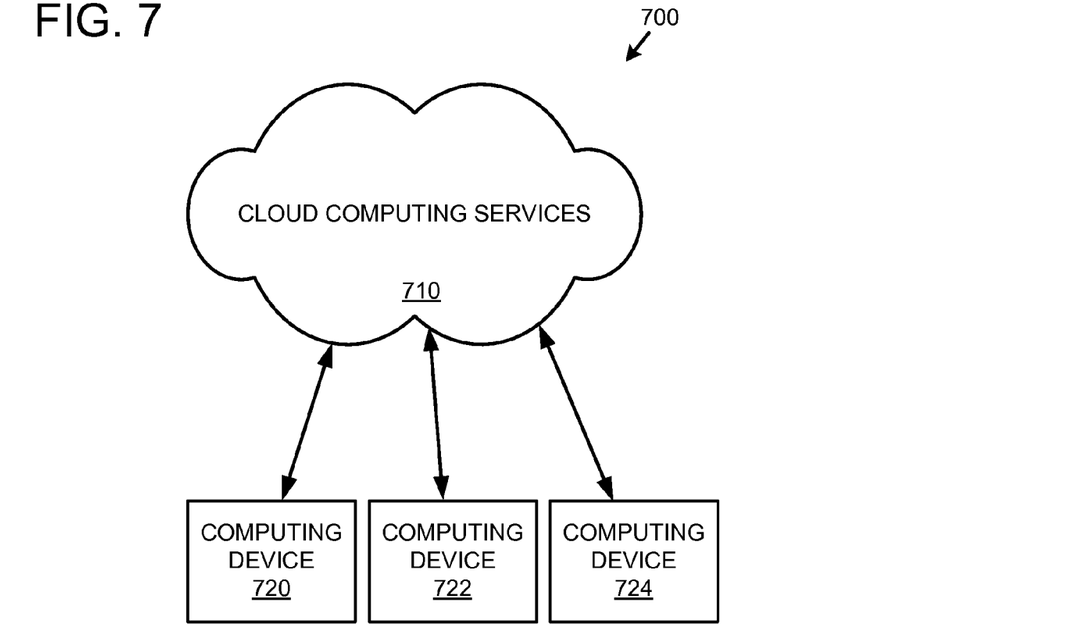
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example 8

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by computing device, for performing transactions within an in-memory database system that stores database data using, at least in part, a row store and a column store, the method comprising:
    performing a transaction within the in-memory database system, comprising:
        updating data in the row store;
        creating an association between the updated row store data and a transaction object associated with the transaction;
        updating data in the column store;
        creating an association between the updated column store data and the transaction object associated with the transaction; and
        atomically committing the transaction comprising the row store update and the column store update;
        wherein the transaction object stores a transaction state for the transaction, and wherein the transaction object is a single transaction object that is shared across the row store and the column store for the transaction.

2. The method of claim 1, wherein updating data in the row store comprises writing a new version of a row store data record, and wherein updating data in the column store comprises writing a new version of a column store data record.

3. The method of claim 1, wherein updating the data in the row store comprises:
    creating a new row store data record version in version space associated with the row store;
    wherein the association between the updated row store data and the transaction object comprises a pointer from the new row store data record version to the transaction object.

4. The method of claim 1, wherein the association between the updated column store data and the transaction object comprises one or more pointers, and wherein updating the data in the column store comprises:
    creating a new column store data record version in table space associated with the column store;
    creating a destroy timestamp, in version space associated with the column store, associated with an original version of the column store data record; and
    creating a creation timestamp, in version space associated with the column store, associated with the new column store data record version.

5. The method of claim 4, wherein the association between the updated column store data and the transaction object comprises:

a pointer from the destroy timestamp to the transaction object; and a pointer from the creation timestamp to the transaction object.

6. The method of claim 1, wherein atomically committing the transaction comprises:

changing the transaction object from an uncommitted state to a committed state.

7. The method of claim 1, further comprising:

setting the transaction object to an uncommitted state;

wherein atomically committing the transaction comprises:

incrementing a global commit timestamp value; and switching the transaction object to a committed state comprising assigning the incremented global commit timestamp value to the transaction object.

8. The method of claim 1, further comprising:

performing a second transaction within the in-memory database system, comprising:

copying a current global commit timestamp value to the second transaction to create a copy of the current global commit timestamp value associated with the second transaction; and determining a version of at least one of row store data and column store data that can be read by the second transaction by comparing the copy of the current global commit timestamp value to timestamp values associated with one or more versions of the one or more of row store data and column store data to be read by the second transaction.

9. A server environment comprising:

one or more computer servers comprising at least a processing unit and a memory; and an in-memory database system configured to perform transactions using database data stored, at least in part, in a row store and a column store, the in-memory database system comprising:

the row store, wherein the row store is configured to:

store row store data;

store updated row store data; and store pointers associating the updated row store data with transaction objects;

the column store, wherein the column store is configured to:

store column store data;

store updated column store data; and store pointers associating the updated column store data with transaction objects; and a transaction manager configured to:

create associations between the updated row store data and transaction objects stored by the transaction manager;

create associations between the updated column store data and transaction objects stored by the transaction manager; and atomically commit transactions;

wherein each transaction is associated with a single transaction object that is shared across the row store and the column store, and wherein each transaction stores a transaction state for the transaction.

10. The server environment of claim 9, wherein the row store is configured to store the updated row store data in version space associated with the row store, and wherein the column store is configured to store the updated column store data in table space associated with the column store.

11. The server environment of claim 9, wherein the column store comprises column store version space storing:

destroy timestamps associated with the column store data which is being updated by the transactions; and creation timestamps associated with the updated column store data.

12. The server environment of claim 9, wherein the transaction manager atomically commits a transaction by changing a transaction object, associated with the transaction, from an uncommitted state to a committed state.

13. The server environment of claim 9, wherein the transaction manager is configured to perform a transaction by:

setting the transaction object to an uncommitted state; and atomically committing the transaction comprising:

incrementing a global commit timestamp value; and switching the transaction object to a committed state comprising assigning the global commit timestamp value to the transaction object.

14. The server environment of claim 9, wherein the transaction manger is further configured to commit a transaction associated with a transaction object by:

incrementing a global commit timestamp value maintained by the transaction manager;

switching the transaction object to a committed state comprising assigning the global commit timestamp value to the transaction object; and copying the global commit timestamp value to updated column store data records and updated row store data records that are being updated by the transaction.

15. A computer-readable storage medium storing computer-executable instructions for causing a computing device to perform a method for implementing transactions within an in-memory database system that stores database data using, at least in part, a row store and a column store, the method comprising:

for each of a plurality of transaction within the in-memory database system:

updating data within at least one of the row store and the column store; and creating an association between the updated data, within at least one of the row store and the column store, and a transaction object associated with the transaction;

associating each transaction object with a group commit object, wherein the group commit object is a single object that is shared by the plurality of transactions; and atomically committing the plurality of transactions, comprising:

incrementing a global commit timestamp value; and switching the group commit object to a committed state comprising setting the group commit object to the global commit timestamp value.

16. The computer-readable storage medium of claim 15, wherein the association between the updated data and the transaction object associated with the transaction comprises a pointer, and wherein the association between each transaction object and the group commit object comprises a pointer.

17. The computer-readable storage medium of claim 15, wherein atomically committing the plurality of transactions further comprises:

using a single disk operation to write transaction log information for the plurality of transactions to disk.

18. The computer-readable storage medium of claim 15, wherein the group commit object stores transaction state for the plurality of transactions.

19. The computer-readable storage medium of claim 15, wherein at least one transaction, of the plurality of transactions, updates data in both the row store and the column store.

* * * * *